United States Patent
Reed et al.

(10) Patent No.: US 10,922,159 B2
(45) Date of Patent: Feb. 16, 2021

(54) MINIMALLY DISRUPTIVE DATA CAPTURE FOR SEGMENTED APPLICATIONS

(71) Applicant: International Business Machines Corporation, Armonk, NY (US)

(72) Inventors: Thomas C. Reed, Tucson, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/385,758

(22) Filed: Apr. 16, 2019

(65) Prior Publication Data

US 2020/0334091 A1 Oct. 22, 2020

(51) Int. Cl.
G06F 11/07 (2006.01)

(52) U.S. Cl.
CPC ........ G06F 11/073 (2013.01); G06F 11/0793 (2013.01)

(58) Field of Classification Search
CPC .......................... G06F 11/073; G06F 11/0793
See application file for complete search history.

(56) References Cited

U.S. PATENT DOCUMENTS

| | | | | |
|---|---|---|---|---|
| 6,622,259 B1* | 9/2003 | Schmuck | ............ | G06F 9/4862 712/216 |
| 6,910,153 B2* | 6/2005 | Kapulka | ............ | G06F 11/0709 711/162 |
| 9,026,737 B1 | 5/2015 | Armangau et al. | | |
| 9,069,484 B2 | 6/2015 | Zhang et al. | | |
| 9,195,592 B1 | 11/2015 | Weingarten et al. | | |
| 9,235,531 B2 | 1/2016 | Celis et al. | | |
| 9,436,597 B1 | 9/2016 | Karamcheti | | |
| 9,946,592 B2 | 4/2018 | Rasor et al. | | |
| 2011/0225458 A1 | 9/2011 | Zuo et al. | | |
| 2013/0067172 A1 | 3/2013 | Rizzo et al. | | |
| 2014/0188952 A1 | 7/2014 | Killamsetti et al. | | |
| 2015/0026133 A1 | 1/2015 | Kozin et al. | | |

(Continued)

OTHER PUBLICATIONS

Bhattacharjee et al.; "Enhancing Recovery Using an SSD Buffer Pool Extension", DaMoN'11 7th ACM International Workshop On, pp. 10-16, Jun. 13, 2011.

(Continued)

*Primary Examiner* — Joseph R Kudirka
(74) *Attorney, Agent, or Firm* — Nelson and Nelson; Daniel P. Nelson; Alexis V. Nelson

(57) ABSTRACT

A method for performing a data dump includes detecting an error in a segmented application having an address space and a buffer. In response to detecting the error, the method quiesces the address space and copies content of the address space to another location while the address space is quiesced. The method reactivates the address space after the content of the address space is completely copied. The method suspends write access to the buffer and copies content of the buffer to another location while write access to the buffer is suspended. While write access to the buffer is suspended, the method redirects writes intended for the buffer to a temporary storage area, and directs reads intended for the buffer to one of the buffer and the temporary storage area, depending on where valid data is stored. A corresponding system and computer program product are also disclosed.

20 Claims, 7 Drawing Sheets

(56) References Cited

U.S. PATENT DOCUMENTS

2016/0055257 A1    2/2016  Sinha
2017/0242858 A1    8/2017  Lee et al.

OTHER PUBLICATIONS

Gilbert et al.; "Evaluation of Pointer Swizzling for Database Buffer Management", 29th GI—Workshop on Foundations of Databases, Germany, pp. 1-6, May 30-Jun. 2, 2017.

Do et al.; "Turbocharging DBMS Buffer Pool Using SSDs", SIGMOD'11 ACM SIGMOD International Conference On, pp. 1113-1124, Jun. 12-16, 2011.

Bohling, Neal; "VSAM RLS Best Practices", SHARE Incorporation, pp. 1-75, 2014.

\* cited by examiner

MINIMALLY DISRUPTIVE DATA CAPTURE FOR SEGMENTED APPLICATIONS

BACKGROUND

Field of the Invention

This invention relates to systems and methods for performing minimally disruptive data dumps in segmented application.

Background of the Invention

VSAM record-level sharing (RLS) is a VSAM data set access method that enables VSAM data to be shared, with full update capability, between many host systems and applications. VSAM RLS is a segmented application in that the application and the data/cache that are utilized by the application are isolated from one another. Thus the address space that hosts the application and the buffers (i.e., local cache) that store data can be accessed and locked independently from one another.

When a failure occurs in a segmented application such as VSAM RLS, the content of the address space and buffers at the time of the failure are ideally captured so that the content may be analyzed and used to determine the root cause of the failure. To capture this information, the address space and buffers typically need to be locked for some amount of time to ensure that the information contained therein does not change until it is copied (i.e., "dumped") to another location. While this dump is taking place, access to production data may be interrupted.

VSAM RLS supports the use of very large buffers and, when very large buffers are used, capturing the information in these buffers can be very time consuming. For example, it is not unusual for VSAM RLS to have buffer pools that exceed thirty gigabytes in size and an address space that is up to four gigabytes in size. Due to the size of these data structures, some users are unwilling to perform dumps to capture the content of these data structures due to the impact it will have on their production systems. This can make it difficult or impossible to gather needed diagnostic information in order to determine the root cause of critical errors occurring in segmented applications such as VSAM RLS.

In view of the foregoing, what are needed are systems and methods to more efficiently perform data dumps in VSAM RLS and similarly segmented applications. Ideally, such systems and methods will cause minimal disruption to such applications and therefore minimal disruption to production systems.

SUMMARY

The invention has been developed in response to the present state of the art and, in particular, in response to the problems and needs in the art that have not yet been fully solved by currently available systems and methods. Accordingly, the invention has been developed to provide systems and methods for performing data dumps in segmented applications. The features and advantages of the invention will become more fully apparent from the following description and appended claims, or may be learned by practice of the invention as set forth hereinafter.

Consistent with the foregoing, a method for performing a data dump in a segmented application is disclosed herein. In one embodiment, such a method includes detecting an error in a segmented application. The segmented application includes an address space for storing executables and a buffer for storing data. In response to detecting the error, the method quiesces the address space and copies content of the address space to another location while the address space is quiesced. The method reactivates the address space after the content of the address space is completely copied. The method suspends write access to the buffer and copies content of the buffer to another location while write access to the buffer is suspended. While write access to the buffer is suspended, the method redirects writes intended for the buffer to a temporary storage area, and directs reads intended for the buffer to one of the buffer and the temporary storage area, depending on where valid data is stored. The method maintains an index to determine where valid data is stored in the buffer and temporary storage area.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
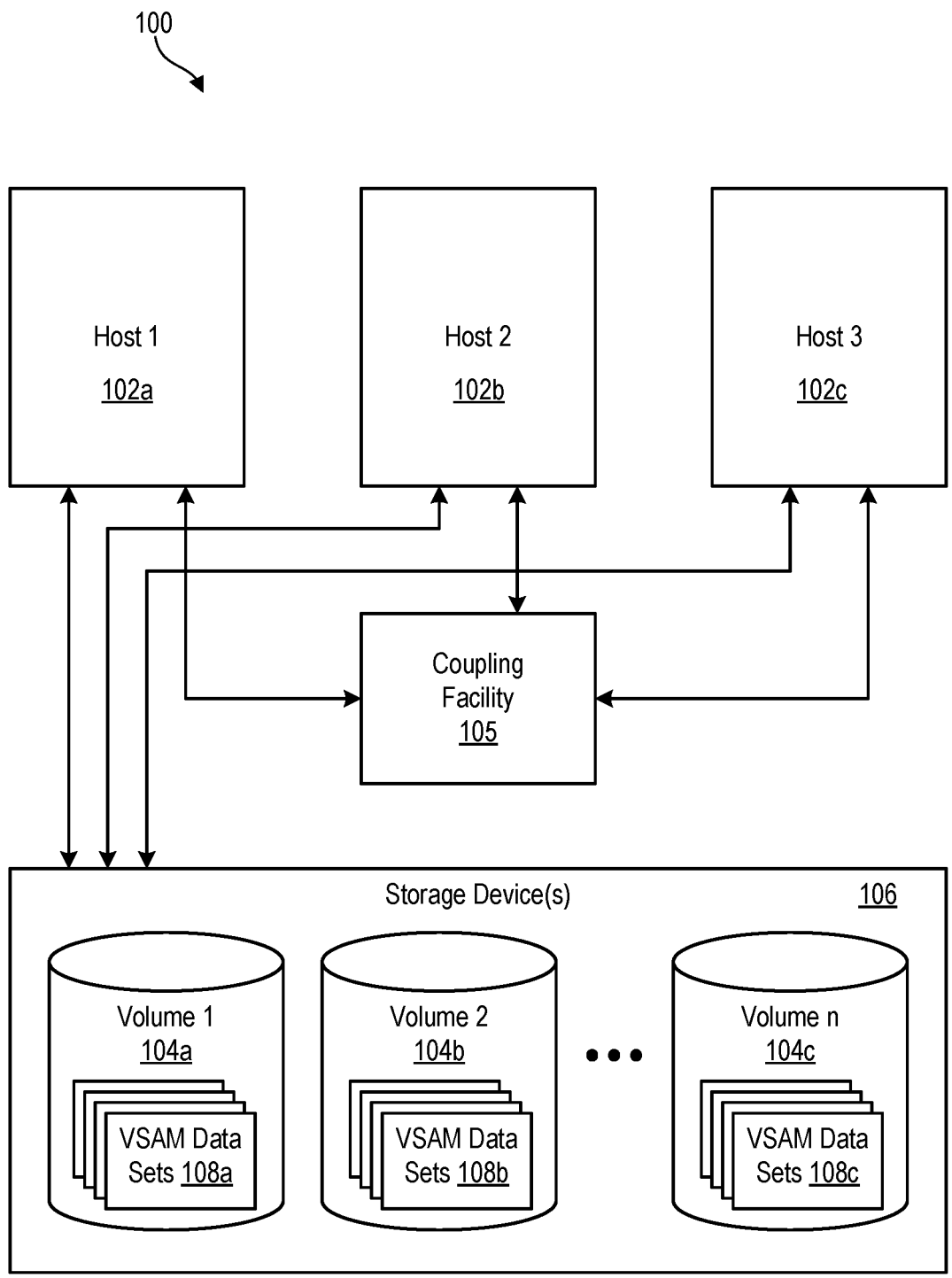
FIG. 1 is a high-level block diagram showing one example of an environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one embodiment of an environment 100 for implementing a system and method in accordance with the invention is illustrated. In the illustrated embodiment, the environment 100 is an IBM Sysplex® environment 100. Nevertheless, embodiments of the invention are not limited to operating within an IBM Sysplex® environment 100 but may include any comparable or analogous environment, regardless of the manufacturer, product name, or components or component names associated with the environment. Furthermore, any environment that could benefit from one or more embodiments of the invention is deemed to fall within the scope of the invention. Moreover, systems and methods in accordance with the invention may be used in any environment that exhibits the same issues or problems disclosed herein. Such environments are also deemed to fall within the scope of the present invention. Thus, the Sysplex® environment 100 is presented only by way of example and is not intended to be limiting.

A Sysplex® environment 100 may be configured to enable multiple mainframe processors of host systems 102*a-c* to act as a single unit and share the same data, while ensuring data integrity, enabling resource sharing, and balancing workloads. For example, the host systems 102*a-c* may share data stored in one or more storage device (e.g., DASD) volumes 104*a-c*. A coupling facility 105 may include computer hardware and/or software that enable the host systems 102*a-c* to share the same data. In certain embodiments, the coupling facility 105 may include a cache to store information shared among the attached host systems 102*a-c*.

Data stored in the volumes 104*a-c* may map to one or more storage devices 106. The storage devices 106 may include single disk drives or solid state drive s, arrays of disk drives or solid state drives, or other storage devices 106 known to those of skill in the art. The volumes 104*a-c* may reside on a single storage device 106 or span multiple storage devices 106. In certain embodiments, the data in the volumes 104*a-c* may be stored in the form of one or more VSAM (Virtual Storage Access Method) data sets 108*a-c*.

Figure 2:
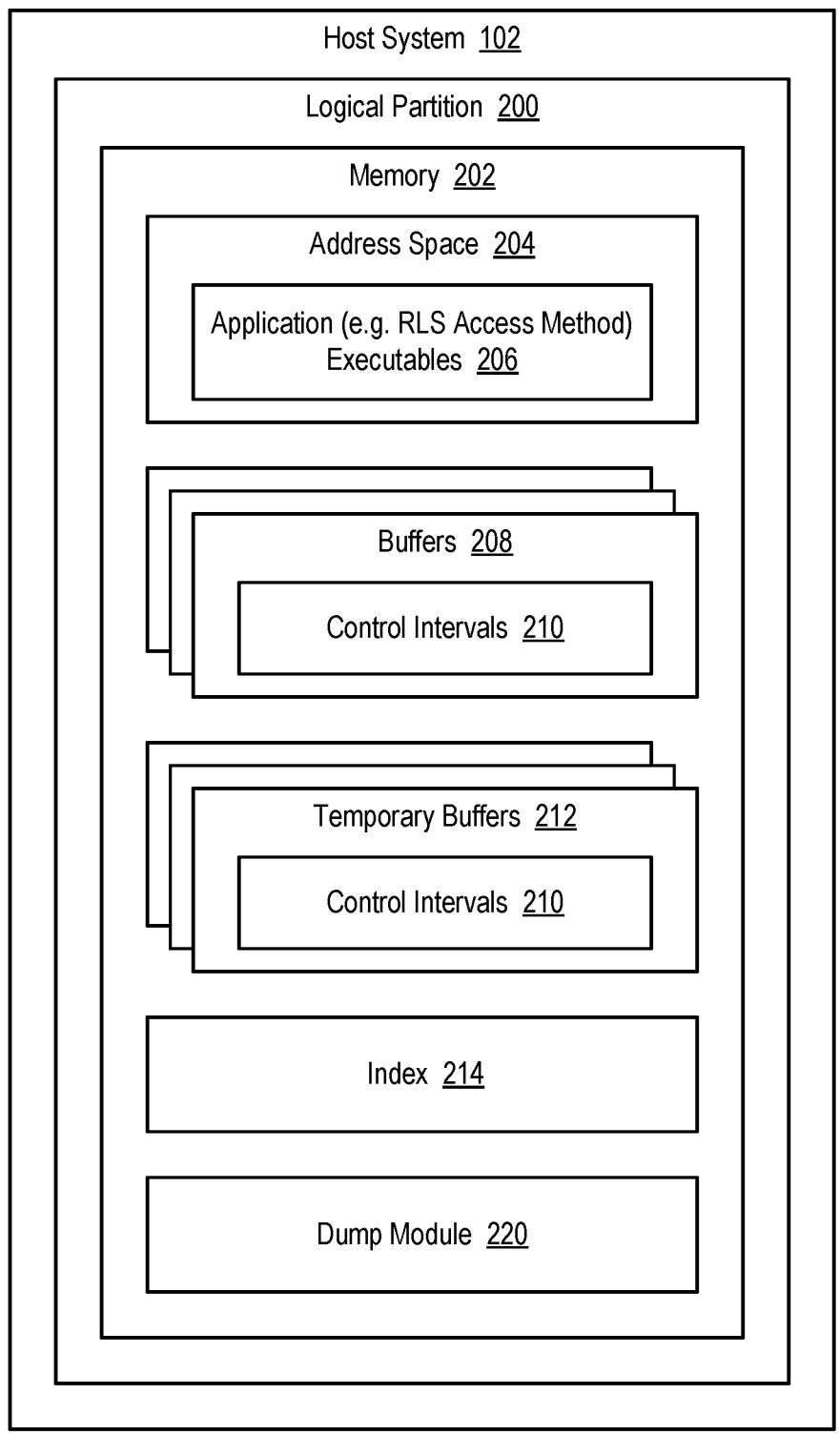
FIG. 2 is a high-level block diagram showing various data structures that may be used to implement systems and methods in accordance with the invention.

Referring to FIG. 2, VSAM record-level sharing (RLS) is a VSAM data set access method that enables VSAM data to be shared, with full update capability, between many applications running on the same or different host systems 102. VSAM RLS is a segmented application in that the application and the data/cache that are utilized by the application are isolated from one another. That is, the address space 204 that hosts the application 206, and the buffers 208 (i.e., local cache) that store data for use by the application 206, can be accessed and locked independently from one another.

When a failure occurs in a segmented application such as VSAM RLS, the content of the address space 204 and buffers 208 are ideally captured so that the content can be analyzed and used to determine the root cause of the failure. To capture this information, the address space 204 and buffers 208 typically need to be locked for some amount of time to ensure that the information contained therein does not change until it can be copied (i.e., "dumped") to another location. While this dump is taking place, access to production data (e.g., the VSAM data sets 108) may be undesirably interrupted.

VSAM RLS supports the use of very large buffers 208 and, when very large buffers 208 are used, capturing the information in these buffers 208 can be very time consuming. For example, it is not unusual for VSAM RLS to have buffer pools 208 that exceed thirty gigabytes in size and an address space 204 that is up to four gigabytes in size. Due to the size of these data structures, some users may be unwilling to perform dumps to capture the content of these data structures due to the impact it will have on their production systems. This can make it impossible to gather needed diagnostic information in order to determine the root cause of critical errors occurring in segmented applications 206 such as VSAM RLS. Thus, systems and methods are needed to more efficiently data dump in VSAM RLS and similarly segmented applications 206. Ideally, such systems and methods will cause minimal disruption to such applications 206 and therefore minimal disruption to production systems.

FIG. 2 is a high-level block diagram showing various data structures that may be used to implement systems and methods in accordance with the invention. As shown, a host system 102 may include a logical partition (LPAR) 200 that represents a logical division of resources (e.g., processors, memory 202, etc.). This set of resources may be operated independently with its own operating system (e.g., z/OS) and applications 206. As shown, in certain embodiments, when a segmented application such as VSAM RLS is operated in the logical partition 200, the memory 202 includes an address space 204 that stores application executables 206, and one or more buffers 208 to store data elements such as control intervals 210. In certain embodiments, different buffers 208 may be utilized to accommodate control intervals 210 of different sizes. For example, a first buffer 208 may be used to store control intervals 210 of a first size (4K bytes), a second buffer 208 may be used to store control intervals 210 of a second size (8K bytes), and so forth.

In order to more efficiently perform a data dump of a segmented application such as VSAM RLS, systems and methods in accordance with the invention may establish a temporary storage area, and more specifically one or more temporary buffers 212 in memory 202 of the host system 102. In certain embodiments, a temporary buffer 212 may be allocated for each existing buffer 208 of VSAM RLS. For example, a first temporary buffer 212 may be allocated for a first existing buffer 208 that stores control intervals 210 of a first size (4K bytes), a second temporary buffer 212 may be allocated for a second existing buffer 208 that stores control intervals 210 of a second size (8K bytes), and so forth. As will be explained in more detail hereafter, the temporary buffers 212 may be utilized to store new or updated control intervals 210 while data is being dumped from the existing buffers 208. An index 214 may be used to keep track of control intervals 210 that are written to the temporary buffers 212 as well as which control intervals 210 in the existing buffers 208 are invalidated while data is being dumped. The function of the index 214 will be explained in more detail hereafter. A dump module 220 may contain functionality to perform the data dump using the temporary buffers 212 and the index 214. The dump module 220 and its functionality will be explained in more detail in association with FIG. 7.

Figure 3:
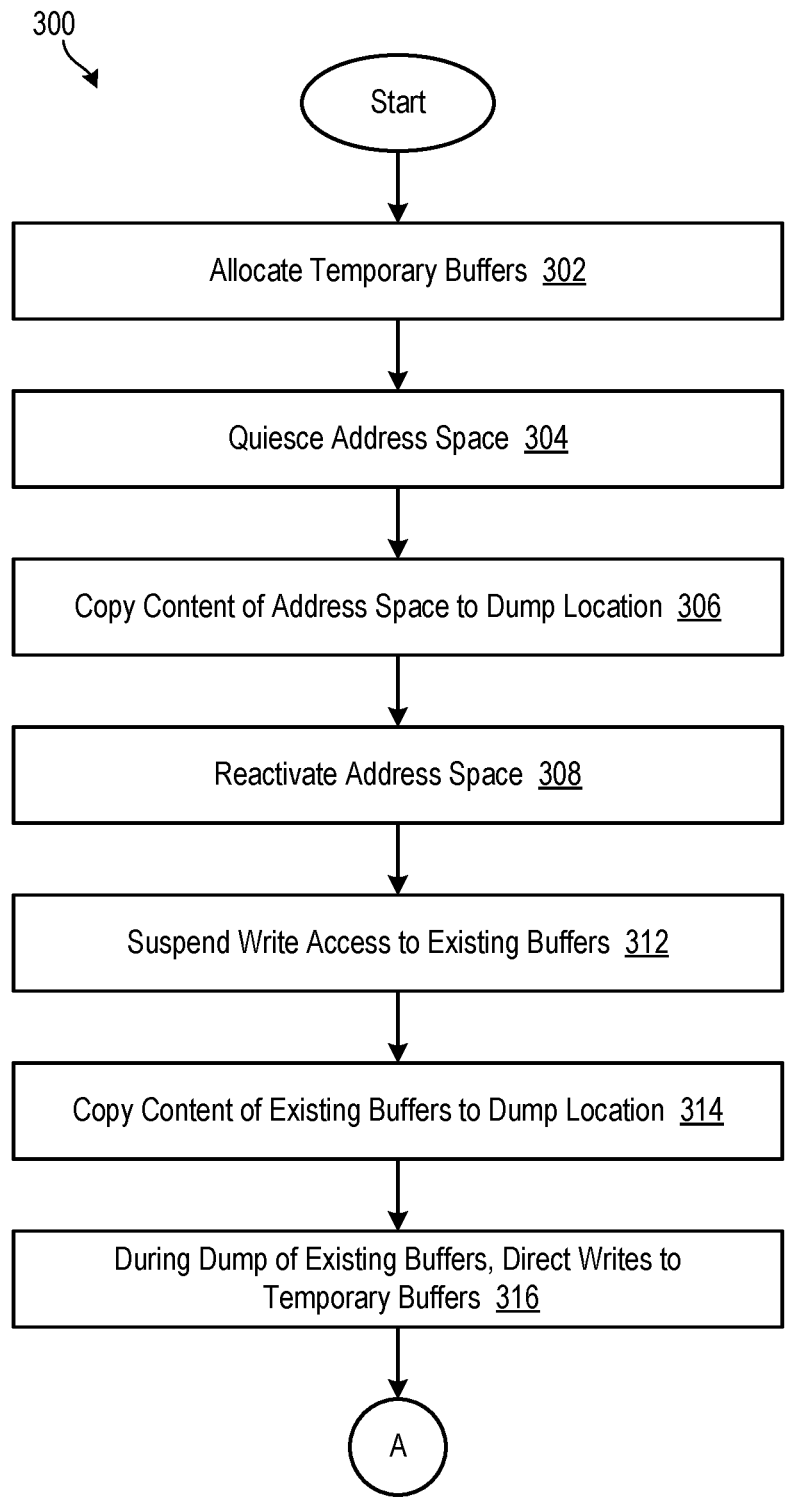
FIGS. 3 and 4 contain a flow diagram showing one embodiment of a method for dumping data in a segmented application.
Figure 4:
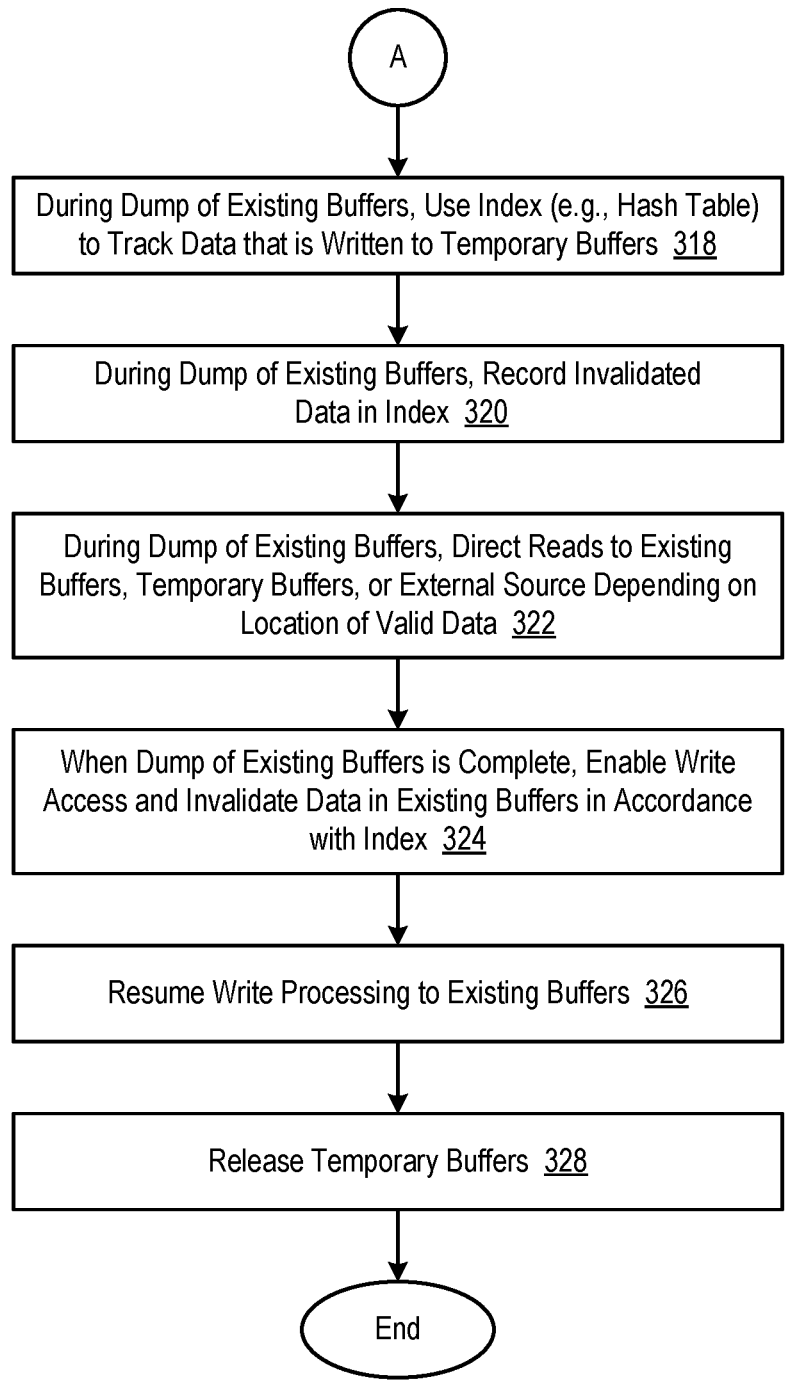

Referring to FIGS. 3 and 4, one embodiment of a method 300 for performing a data dump of a segmented application such as VSAM RLS is illustrated. As shown, when an error is detected in the segmented application, the method 300 allocates 302 a temporary storage area in the form of temporary buffers 212 to receive writes (e.g., new and updated control intervals 210) while data is being dumped from existing buffers 208. In certain embodiments, the method 300 initially quiesces 304 the address space 204 of the segmented application to ensure that the address space 204 remains in a consistent state while its content is copied. While the address space 204 is quiesced, the method 300 copies 306 the content of the address space 204 to a dump location, such as one or more dump data sets. During this time period, operation of the application 206 may be paused and changes to the address space 204 may be prohibited. After the copy is complete, the method 300 reactivates 308 the address space 204, thereby allowing the application 206 (e.g., VSAM RLS) to resume operation.

Figure 5:
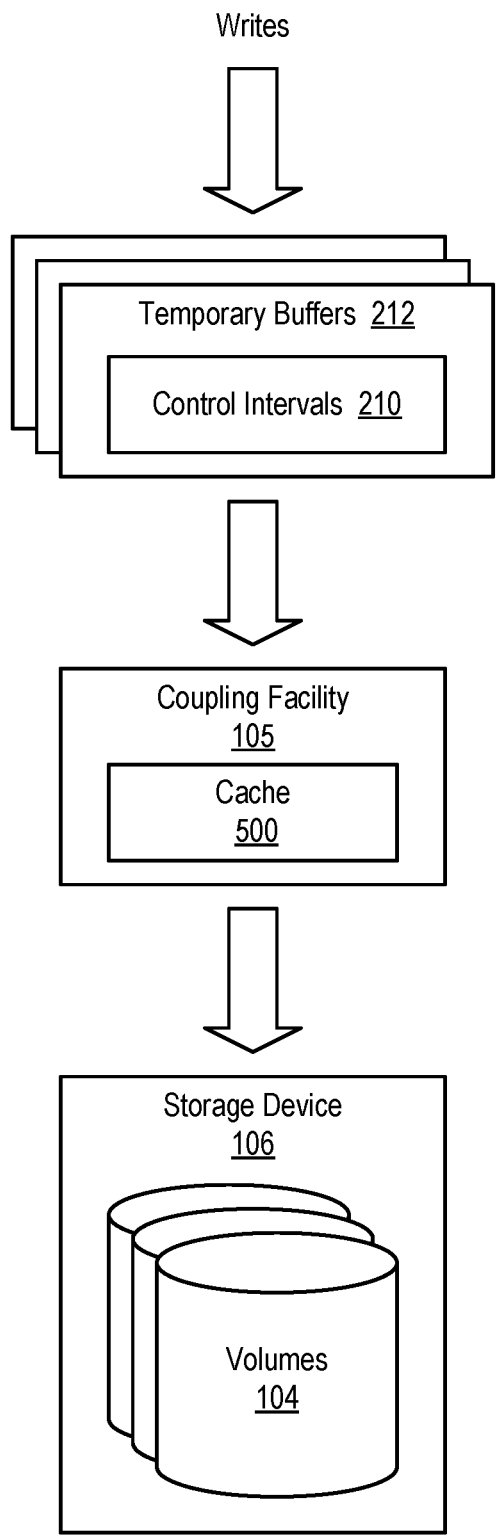
FIG. 5 is a flow diagram showing how write processing is performed while dumping data in a segmented application.

The method 300 further suspends 312 write access to the existing buffers 208. This may occur at or near the same time the address space 204 is quiesced 304. Once write access is suspended 312 to the existing buffers 208, the method 300 begins copying 314 content of the existing buffers 208 to the dump location. While copying 314 the content of the existing buffers 208, the method 300 directs 316 writes (e.g., new or updated control intervals 210) to the temporary buffers 212. The method 300 utilizes 318 an index 214, such as a hash table, to track which data is written to the temporary buffers 212. When data is written to the temporary buffers 212, write-through buffering may occur such that the data is also written to cache 500 of the coupling facility 105 as well as to the volumes 104 on the storage devices 106, as shown in FIG. 5. The method 300 may also utilize 318 the index 214 to record data that has been invalidated in the existing buffers 208 while they are being copied. For example, data elements (e.g., control intervals 210) that reside in the existing buffers 208 may be deleted or updated while the data dump is taking place. These data elements may be marked as invalid in the index 214. In other cases, messages may be received from other host systems 102 in a Sysplex® environment 100 that invalidate data contained in the existing buffers 208 and/or temporary buffers 212. This may also, in certain embodiments, be recorded in the index 214.

Figure 6:
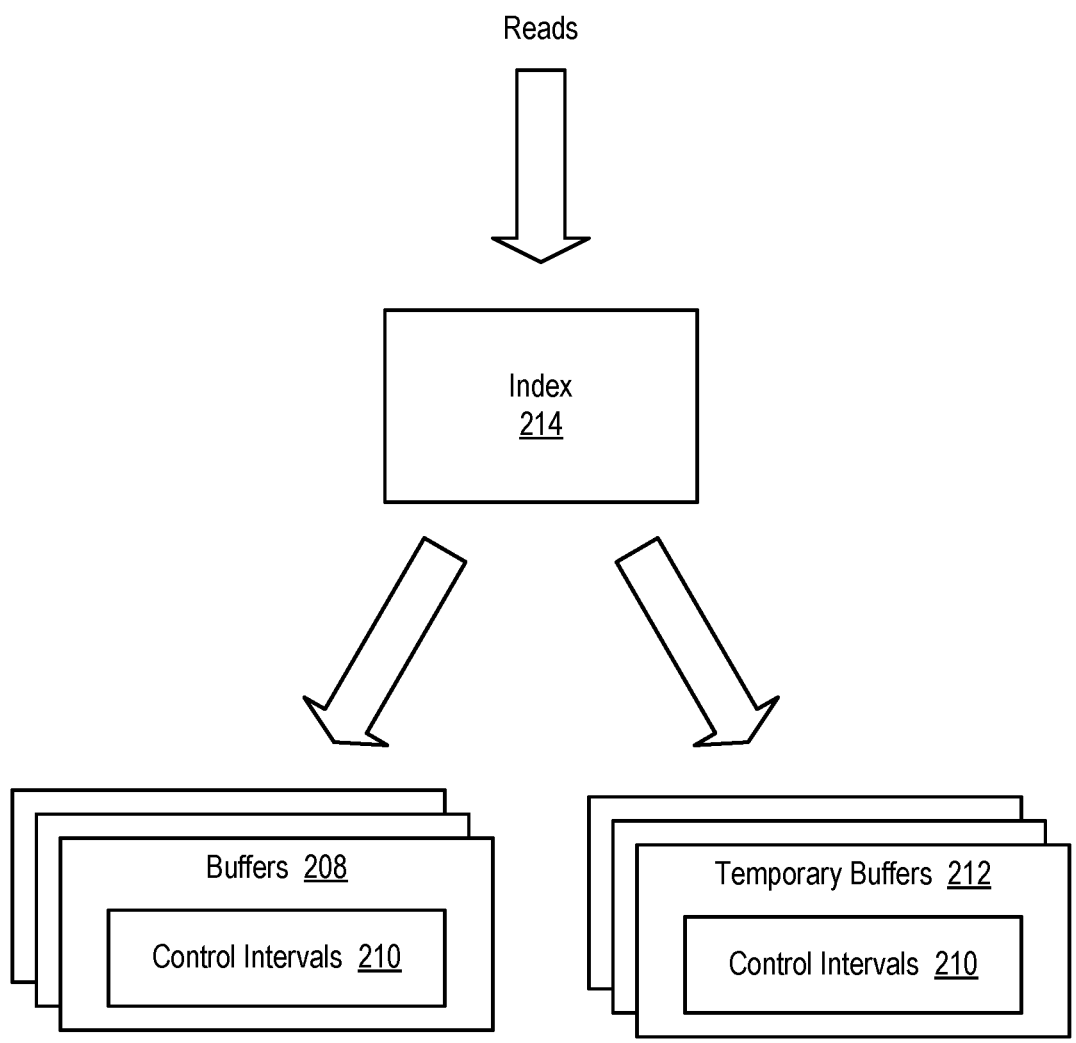
FIG. 6 is a flow diagram showing how read processing is performed while dumping data in a segmented application.

While the content of the existing buffers 208 is being copied, read-access may be maintained for the existing buffers 208. When VSAM RLS issues read requests, these read requests may be directed 322 to the existing buffers 208 and/or the temporary buffers 212, depending on where valid data is stored, as shown in FIG. 6. The index 214 may be used to determine where valid data is stored. If read data is not found locally in either the existing buffers 208 or the temporary buffers 212, the read data may be retrieved from the cache 500 in the coupling facility 105, or from the volumes 104 in the storage devices 106, as needed.

When all data is coped from the existing buffers 208 to the dump location, the method 300 may enable 324 read/write access to the existing buffers 208 while at the same time not processing writes from the application 206 on the existing buffers 208. This enables the method 300 to invalidate data in the existing buffers 208 as recorded in the index 214. Once any invalid data in the existing buffers 208 has been marked as invalid, the method 300 may resume 326 write processing to the existing buffers 208. At this point, the data dump for the segmented application is complete, meaning that all content of the address space 204 and the existing buffers 208 has been copied to the dump location.

The method 300 may then release 328 the temporary buffers 212. This may include releasing memory 202 allocated to the temporary buffers 212 or simply releasing use of the temporary buffers 212 so they can be reused at a later time. When the temporary buffers 212 are released 328, this may occur without merging content of the temporary buffers 212 with the existing buffers 208. Because data that was written to the temporary buffer 212 was written through to the coupling facility cache 500 and/or volumes 104, data may be retrieved from these locations after the temporary buffers 212 are released. Although this may result in a longer fetch time, this technique avoids the need to merge the content of the temporary buffers 212 with that of the existing buffers 208, which in turn saves time and/or processing resources. This also reduces the time needed to complete the data dump.

Figure 7:
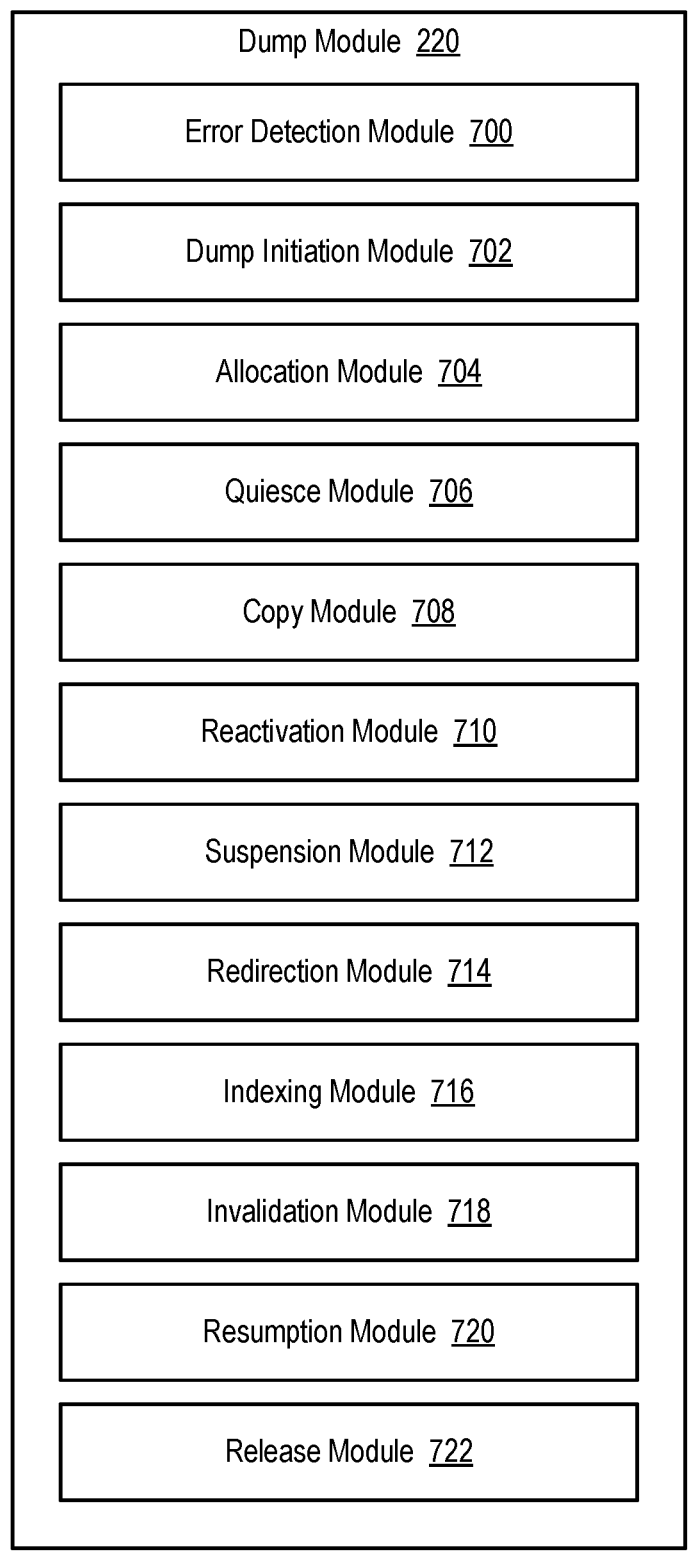
FIG. 7 is a high-level block diagram showing a dump module and various associated sub-modules.

Referring to FIG. 7, in certain embodiments, the method 300 illustrated in FIGS. 3 and 4 may be implemented by the dump module 220 previously discussed. This dump module 220 may include various sub-modules to provide various features and functions. The dump module 220 and associated sub-modules may be implemented in hardware, software, firmware, or combinations thereof. The dump module 220 and associated sub-modules are presented by way of example and not limitation. More or fewer sub-modules may be provided in different embodiments. For example, the functionality of some sub-modules may be combined into a single or smaller number of sub-modules, or the functionality of a single sub-module may be distributed across several sub-modules.

As shown, the dump module 220 includes one or more of an error detection module 700, dump initiation module 702, allocation module 704, quiesce module 706, copy module 708, reactivation module 710, suspension module 712, redirection module 714, indexing module 716, invalidation module 718, resumption module 720, and release module 722.

The error detection module 700 may be configured to detect when an error occurs in a segmented application. In response to the error, the dump initiation module 702 initiates a dump of the segmented application. To perform this dump, the allocation module 704 allocates a temporary storage area, and more specifically temporary buffers 212 to correspond to existing buffers 208 of the segmented application. The dump module 220 may be then begin dumping the contents of the segmented application's address space 204 and existing buffers 208 to a dump location, such as one or more dump data sets.

To accomplish this, the quiesce module 706 quiesces the address space 204 to ensure that the address space 204 remains in a consistent state during the dump. Once the address space 204 is quiesced, the copy module 708 copies content of the address space 204 to the dump location. Once the address space 204 is fully copied, the reactivation module 710 reactivates the address space 204, thereby enabling the application 206 (e.g., VSAM RLS) to resume operation.

To dump the data in the existing buffers 208, the suspension module 712 suspends write access to the existing buffers 208. The redirection module 714 then redirects writes intended for the existing buffers 208 to the temporary buffers 212. The indexing module 716 maintains an index 214 to keep track of writes that have been made to the temporary buffers 212. The indexing module 716 may also use the index 214 to keep track of data that has been invalidated in the existing buffers 208 and the temporary buffers 212. Using the index 214, the redirection module 714 may direct reads to the existing buffers 208 and the temporary buffers 212 depending on where valid data is stored. If the requested data is not stored in either the existing buffers 208 or the temporary buffers 212, the redirection module 714 may direct reads externally, such as to the coupling facility cache 500 or to external volumes 104.

Once the data in the existing buffers 208 has been completely copied to the dump location, the invalidation module 718 may resume write access to the existing buffers 208 and, using the index 214, mark any invalid data elements contained therein as invalid. The resumption module 720 may then resume write processing to the existing buffers 208. Once the data dump is complete, the release module 722 releases any temporary buffers 212. At this point, the address space 204 and existing buffers 208 return to normal operation.

The systems and methods disclosed herein may significantly reduce the time needed to perform a data dump and the accompanying downtime of production systems. In some cases, particularly where the existing buffers 208 are small, it may be faster to simply quiesce the address space 204 and existing buffers 208 during the entire time of the data dump, without using the temporary buffers 212 previously described. In certain embodiments, systems and methods in accordance with the invention may determine a break-even point. That is, systems and methods in accordance with the invention may determine how large the existing buffers 208 need to be to make use of the temporary buffers 212 advantageous. If the existing buffers 208 are larger than this size, the temporary buffers 212 may be used to perform a data dump. If the existing buffers 208 are smaller than this size, the temporary buffers 212 may not be used to perform a data dump. Other factors, such as the speed of storage devices 106 and available processing resources may factor into the establishment of the break-even point.

Although the systems and methods disclosed herein have been described primarily in association with VSAM RLS, the systems and methods are not limited to VSAM RLS. Rather, the disclosed systems and methods may be applied to other types of segmented applications where the application 206 and data 210 are maintained separately and can be locked independently. In other words, the systems and methods disclosed herein may also reduce the impact and interruption that data dumps have on other types of applications.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for performing a data dump of a segmented application, the method comprising:
    detecting an error in a segmented application, the segmented application comprising an address space for storing executables and a buffer for storing data; and
    in response to detecting the error, performing the following:
        quiescing the address space and copying content of the address space to another location while the address space is quiesced;
        reactivating the address space after the content of the address space is completely copied;
        suspending write access to the buffer and copying content of the buffer to another location while write access to the buffer is suspended;
        while write access to the buffer is suspended, redirecting writes intended for the buffer to a temporary storage area, and directing reads intended for the buffer to both the buffer and the temporary storage area depending on where valid data is stored; and
        maintaining an index to determine where valid data is stored in the buffer and the temporary storage area.

2. The method of claim 1, wherein the segmented application is Virtual Storage Access Method (VSAM) record-level sharing (RLS).

3. The method of claim 1, further comprising resuming write access to the buffer after the content of the buffer is completely copied.

4. The method of claim 1, wherein resuming write access to the buffer comprises resuming write access to the buffer without merging content of the temporary storage area with content of the buffer.

5. The method of claim 1, wherein the index is a hash table.

6. The method of claim 1, further comprising recording, in the index, which data in the buffer has become invalid while write access to the buffer was suspended.

7. The method of claim 1, further comprising, after the content of the buffer is completely copied, marking invalid data in the buffer as invalid.

8. A computer program product for performing a data dump of a segmented application, the computer program product comprising a non-transitory computer-readable storage medium having computer-usable program code embodied therein, the computer-usable program code configured to perform the following when executed by at least one processor:
    detect an error in a segmented application, the segmented application comprising an address space for storing executables and a buffer for storing data; and
    in response to detecting the error, perform the following:
        quiesce the address space and copy content of the address space to another location while the address space is quiesced;
        reactivate the address space after the content of the address space is completely copied;
        suspend write access to the buffer and copy content of the buffer to another location while write access to the buffer is suspended;
        while write access to the buffer is suspended, redirect writes intended for the buffer to a temporary storage area, and direct reads intended for the buffer to both the buffer and the temporary storage area depending on where valid data is stored; and
        maintain an index to determine where valid data is stored in the buffer and the temporary storage area.

9. The computer program product of claim 8, wherein the segmented application is Virtual Storage Access Method (VSAM) record-level sharing (RLS).

10. The computer program product of claim 8, wherein the computer-usable program code is further configured to resume write access to the buffer after the content of the buffer is completely copied.

11. The computer program product of claim 8, wherein resuming write access to the buffer comprises resuming write access to the buffer without merging content of the temporary storage area with content of the buffer.

12. The computer program product of claim 8, wherein the index is a hash table.

13. The computer program product of claim 8, wherein the computer-usable program code is further configured to record, in the index, which data in the buffer has become invalid while write access to the buffer was suspended.

14. The computer program product of claim 8, wherein the computer-usable program code is further configured to, after the content of the buffer is completely copied, mark invalid data in the buffer as invalid.

15. A system for performing a data dump of a segmented application, the system comprising:
    at least one processor;
    at least one memory device operably coupled to the at least one processor and storing instructions for execution on the at least one processor, the instructions causing the at least one processor to:
        detect an error in a segmented application, the segmented application comprising an address space for storing executables and a buffer for storing data; and
        in response to detecting the error, perform the following:
            quiesce the address space and copy content of the address space to another location while the address space is quiesced;
            reactivate the address space after the content of the address space is completely copied;
            suspend write access to the buffer and copy content of the buffer to another location while write access to the buffer is suspended;
            while write access to the buffer is suspended, redirect writes intended for the buffer to a temporary storage area, and direct reads intended for the buffer to both the buffer and the temporary storage area depending on where valid data is stored; and maintain an index to determine where valid data is stored in the buffer and the temporary storage area.

16. The system of claim 15, wherein the instructions further cause the at least one processor to resume write access to the buffer after the content of the buffer is completely copied.

17. The system of claim 15, wherein resuming write access to the buffer comprises resuming write access to the buffer without merging content of the temporary storage area with content of the buffer.

18. The system of claim 15, wherein the index is a hash table.

19. The system of claim 15, wherein the instructions further cause the at least one processor to record, in the index, which data in the buffer has become invalid while write access to the buffer was suspended.

20. The system of claim 15, wherein the instructions further cause the at least one processor to, after the content of the buffer is completely copied, mark invalid data in the buffer as invalid.

\* \* \* \* \*